(12) United States Patent
Lee et al.

(10) Patent No.: US 8,490,147 B2
(45) Date of Patent: Jul. 16, 2013

(54) SYSTEM AND METHOD FOR COLLECTING CONTENTS ON AUDIO/VIDEO NETWORK AND CONTROLLING EXECUTION OF THE CONTENTS

(75) Inventors: Lye-suk Lee, Seoul (KR); Seong-taek Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1718 days.

(21) Appl. No.: 11/264,154

(22) Filed: Nov. 2, 2005

(65) Prior Publication Data

US 2006/0095402 A1 May 4, 2006

(30) Foreign Application Priority Data

Nov. 2, 2004  (KR) ........................ 10-2004-0088403

(51) Int. Cl.
*H04N 7/16* (2011.01)
(52) U.S. Cl.
USPC ............. 725/153; 725/48; 725/109; 725/112; 725/141
(58) Field of Classification Search
USPC ............................. 725/48, 109, 112, 141, 153
See application file for complete search history.

(56) References Cited

U.S. PATENT DOCUMENTS

| | | | | |
|---|---|---|---|---|
| 6,594,825 | B1 * | 7/2003 | Iki et al. ........................... | 725/53 |
| 7,047,554 | B1 * | 5/2006 | Lortz ............................. | 725/149 |
| 7,085,807 | B2 * | 8/2006 | Simpson et al. ............... | 709/203 |
| 7,181,502 | B2 * | 2/2007 | Incertis .......................... | 709/217 |
| 7,577,719 | B2 * | 8/2009 | Yoon et al. ..................... | 709/219 |
| 2002/0047899 | A1 * | 4/2002 | Son et al. ....................... | 348/114 |
| 2002/0083153 | A1 * | 6/2002 | Sweatt et al. .................. | 709/218 |
| 2003/0229900 | A1 * | 12/2003 | Reisman .......................... | 725/87 |
| 2004/0216171 | A1 * | 10/2004 | Barone et al. ................. | 725/135 |
| 2005/0019014 | A1 * | 1/2005 | Yoo et al. ......................... | 386/95 |
| 2005/0076364 | A1 * | 4/2005 | Dukes et al. .................... | 725/46 |
| 2006/0004825 | A1 * | 1/2006 | Barda ........................... | 707/102 |

FOREIGN PATENT DOCUMENTS

| | | |
|---|---|---|
| JP | 2002-259381 A | 9/2002 |
| JP | 2003-304473 A | 10/2003 |
| JP | 2004-78424 A | 3/2004 |
| KR | 2003-0058395 A | 7/2003 |
| KR | 2003-0070081 A | 8/2003 |
| WO | 02/054769 A1 | 7/2002 |

* cited by examiner

*Primary Examiner* — Pankaj Kumar
*Assistant Examiner* — Sahar Baig
(74) *Attorney, Agent, or Firm* — Sughrue Mion, PLLC

(57) ABSTRACT

A method and system for sharing information of contents possessed by audio/video (A/V) devices having network interface, which are connected with each other on a network, and efficiently controlling the execution of the contents are provided. In a control device which receives a list of contents from a collection device collecting content information of each content possessed by a source device within an audio/video (A/V) network and controls execution of the content using the list of the contents, the control device includes a contents list requester requesting the list of the contents existing on the A/V network from the collection device in response to a user's command, a web browser displaying a list page, which is provided by the collection device in response to the request of the list, and receiving from the user a command to execute a content selected from the contents displayed on the list page, a content decoder restoring the content from a content stream provided by the source device possessing the selected content, and a content display displaying the restored content to the user.

14 Claims, 9 Drawing Sheets

FIG. 1 (PRIOR ART)

```
<?XML version="1.0"?>
<deviceInfo   xmlns="http://CEStandard.org/deviceInfo.xsd" date="05-26-03"
                                                   version="VX1.0">
<manufacturer    name="Samsung" URI=www.samsung.com/deviceinfo"
                                 serialno="ABC-12358"
                                 manufactureDate="05-30-03"
                                 modelRangeName="Super High"/>
<functionType    name="STB-NIU"
                 subname="TUNER-DISH"
                 modelName="HWW" />
<1394StreamSource     coding="MPEG2"     rate-kbps="19200"/>
<userInterface="none"/>
<eventNotificationUI="none"/>
<HTTPCommandInterfaceRef     name="XHT931"
                     URI=".schemas/XHT931.xsd"/>
</deviceInfo>
```

12 — deviceInfo
13 — manufacturer
14 — functionType
15 — 1394StreamSource
16 — userInterface
17 — eventNotificationUI
18 — HTTPCommandInterfaceRef

FIG. 2 (PRIOR ART)

```
<?XML version="2.0"?>
<OperationList    xmlns="http://CEStandard.org/XHT931.xsd"    date="05-26-03"
                                                    version="VX2.0">
<Op code="EVENT-NOTIFICATION"/>
<Op code="POWER"/>
<Op code="PLAY"/>
<Op code="STOP"/>
<Op code="PAUSE"/>
<Op code="REWIND"/>
</OperationList>
```

22 — OperationList
23 — EVENT-NOTIFICATION
24 — POWER
25 — PLAY
26 — STOP
27 — PAUSE
28 — REWIND

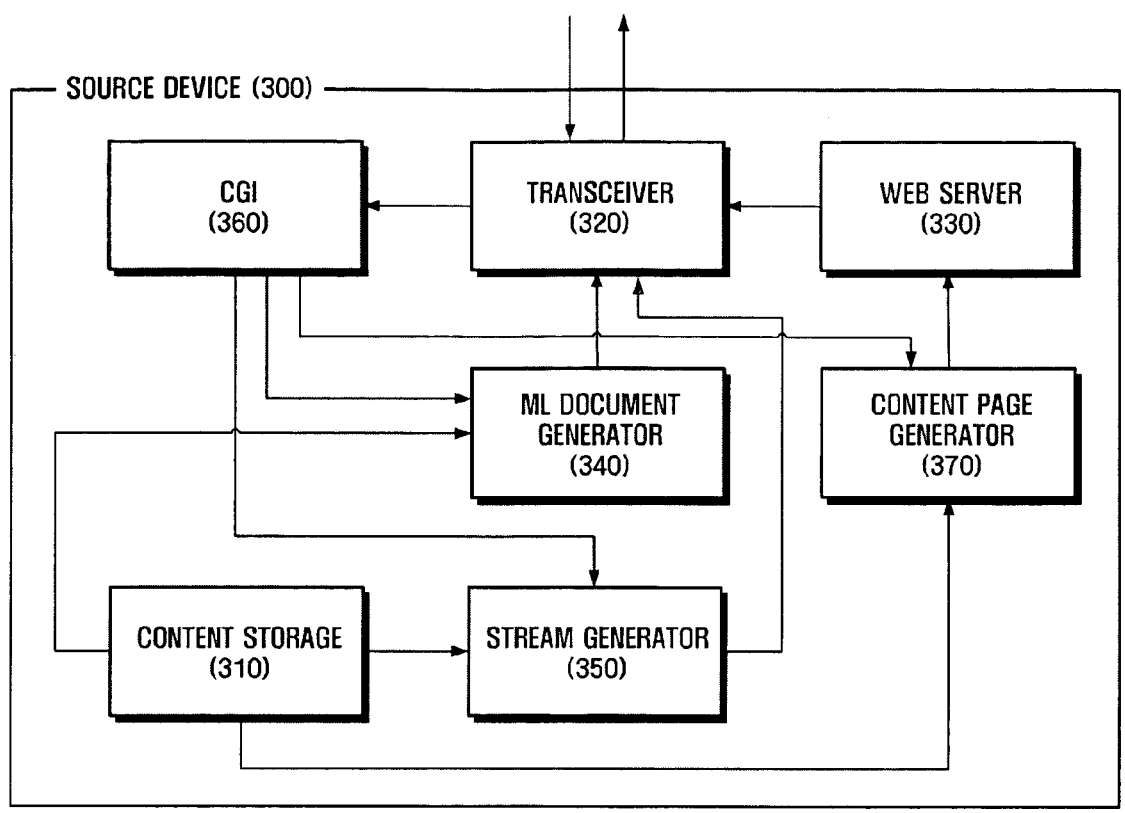

FIG. 6

```xml
<?xml version="1.0" encoding="utf-8" ?>
<xsd:schema targetNamespace="http://www.samsung.com/dsc/contentInfo"
    xmlns="http://www.samsung.com/dsc/contentInfo"
    xmlns:xs="http://www.w3.org/2001/XMLSchema"
    elementFormDefault="qualified">

<xs:element name="contentInfo" type="contentInfoType"/>
        <xs:complexType name="contentInfoType" mixed="false">
            <xs:complexContent>
                <xs:restriction base="xs:anyType">
                    <xs:sequence>
                        <xs:element ref="content" maxOccurs="unbounded"/>
                    </xs:sequence>
                </xs:restriction>
            </xs:complexContent>
        </xs:complexType>

<xs:element name="content" type="contentType"/>
        <xs:complexType name="contentType" mixed="false">
            <xs:complexContent>
                <xs:restriction base="xs:anyType">
                    <xs:sequence>
                        <xs:element name="title" type="xs:string" maxOccurs="1" minOccurs="1"/>
                        <xs:element name="album" type="xs:string" maxOccurs="1" minOccurs="0"/>
                        <xs:element name="singer" type="xs:string" maxOccurs="1" minOccurs="0"/>
                        <xs:element name="preview" type="xs:anyURI" maxOccurs="1" minOccurs="0"/>
                        <xs:element name="group" type="xs:string" maxOccurs="1" minOccurs="0"/>
                        <xs:element name="date" type="xs:string" maxOccurs="1" minOccurs="0"/>
                        <xs:element name="control" type="xs:anyURI" maxOccurs="3" minOccurs="1">
                            <xs:complexType mixed="false">
                                <simpleContent>
                                    <xs:extension base="xs:anyURI">
                                        <xs:attribute name="type">
                                            <xs:simpleType>
                                                <xs:extension base="xs:string">
                                                    <xs:enumeration value="play"/>
                                                    <xs:enumeration value="stop"/>
                                                    <xs:enumeration value="pause"/>
                                                </xs:extension>
                                            </xs:simpleType>
                                        </xs:attribute>
                                    </xs:extension>
                                </simpleContent>
                            </xs:complexType>
                        </xs:element>
                    </xs:sequence>
                </xs:restriction>

<xs:attribute name="type">
                    <xs:simpleType>
                        <xs:extension base="xs:string">
                            <xs:enumeration value="image"/>
                            <xs:enumeration value="audio"/>
                            <xs:enumeration value="video"/>
                        </xs:extension>
                    </xs:simpleType>
                </xs:attribute>
            </xs:complexContent>
        </xs:complexType>
</xsd:schema>
```

FIG. 7

```
<?xml version="1.0" encoding="euc-kr"?>
<contentInfo xmlns="http://www.samsung.com/dsc/contentInfo">
    <content type="audio">
        <title>Number One</title>
        <album>Brilliant Glory</album>
        <singer>BOA</singer>
        <control type="play">http://192.168.0.2/play.cgi?1441.mp3</control>
        <control type="stop">http://192.168.0.2/stop.cgi?1441.mp3</control>
        <control type="pause">http://192.168.0.2/pause.cgi?1441.mp3</control>
    </content>
    <content type="image">
        <title>Tiger Woods</title>
        <group>PGA Tour</group>
        <date>2000-09-23</date>
        <preview>http://192.168.0.2/data1/1236_pv.jpg</preview>
        <control type="play">http://192.168.0.2/play.cgi?1236.jpg</control>
    </content>
    <content type="video">
        <title>the Matrix</title>
        <group>Movie Collection</group>
        <date>2000-10-23</date>
        <control type="play">http://192.168.0.2/play.cgi?matrix.wmv</control>
        <control type="stop">http://192.168.0.2/stop.cgi?matrix.wmv</control>
        <control type="pause">http://192.168.0.2/pause.cgi?matrix.wmv</control>
    </content>
</contentInfo>
```

60 — contentInfo
70 — content type="audio"
71 — audio metadata
80 — content type="image"
81 — image metadata
90 — content type="video"
91 — video metadata

FIG. 8

| TITLE | CONTENT TYPE | . . . |
|---|---|---|
| Number One | AUDIO | |
| Tiger Woods | IMAGE | |
| the Matrix | VIDEO | |
| Tulips | IMAGE | |
| the Mission | VIDEO | |

400

CONTENTS OF SOURCE DEVICE A: Number One, Tiger Woods, the Matrix

CONTENTS OF SOURCE DEVICE B: Tulips, the Mission

430

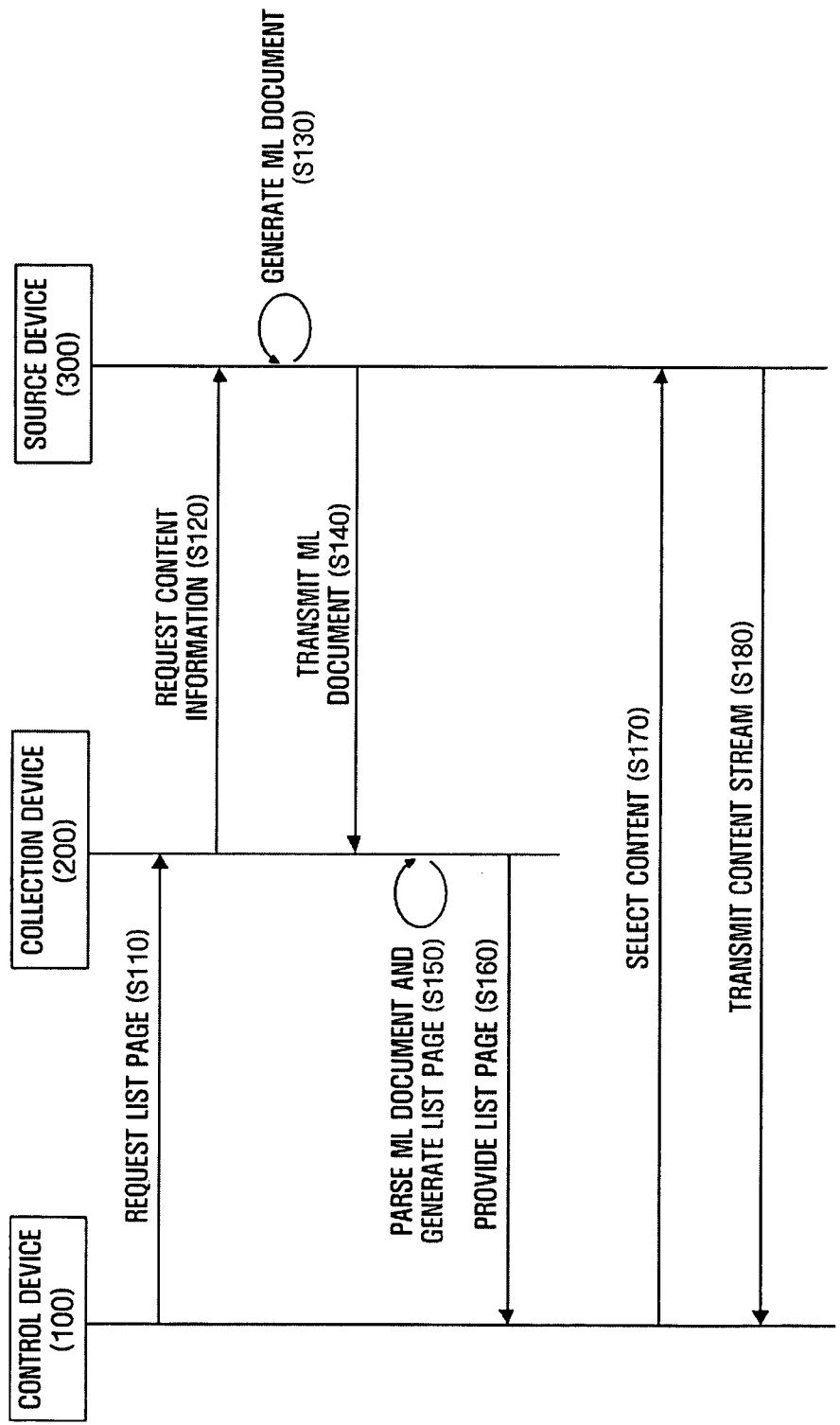

SYSTEM AND METHOD FOR COLLECTING CONTENTS ON AUDIO/VIDEO NETWORK AND CONTROLLING EXECUTION OF THE CONTENTS

CROSS-REFERENCE TO RELATED APPLICATION

This application claims priority from Korean Patent Application No. 10-2004-0088403 filed on Nov. 2, 2004 in the Korean Intellectual Property Office, the disclosure of which is incorporated herein by reference in its entirety.

BACKGROUND OF THE INVENTION

1. Field of the Invention

The present invention relates to an audio/video (A/V) device, and more particularly, to a system and method for sharing information of contents possessed by A/V devices having network interface, which are connected with each other on a network, and efficiently controlling the execution of the contents.

2. Description of the Related Art

With the rapid development of technology of processing digital A/V, diverse A/V devices such as digital televisions (TVs), set-top boxes, digital versatile disc (DVD) players, and digital amplifiers have been installed and used at home and offices. Users at home or offices can conveniently control these A/V devices using remote control units. However, as the number of A/V devices installed in a predetermined space increases, controlling the A/V devices becomes more complicated and difficult.

Therefore, approaches for systemizing a plurality of A/V devices by associating them with one another and enabling a user to conveniently control the systemized A/V devices have been studied. Here, the A/V devices are connected with each other through network interface, thereby forming a single A/V network system.

As one of the approaches, an expandable Home Theater (XHT), i.e., a middleware for A/V home networking has been developed and proposed. The XHT is a home network solution based on a digital TV that has been developed by Samsung and has been adopted for the U.S. Consumer Electronics Association (CEA) standard.

According to the XHT, an A/V device connected with a digital TV and a plurality of digital TVs can be controlled using an Institute of Electrical and Electronics Engineers (IEEE) 1394 cable that can stably transmit high definition (HD) signals and an Internet protocol (IP) that is a communication protocol usually used on the Internet. When the XHT is used, a user in a bedroom can view digital broadcasting using a digital broadcast receiving function of a digital TV installed in a living room.

A cheap network interface unit (NIU) using the XHT is made in a format of a memory card and is thus easy to change according to a receiving scheme such as a terrestrial, satellite, or cable scheme, thereby reducing the financial burden on a broadcasting company. In particular, the XHT can provide diverse portal services through a browser embedded in a digital TV.

In a sequence of operations of A/V devices implemented using the XHT, a local IP address is automatically allocated to each of A/V devices on an XHT network according to a predetermined address allocation algorithm. Next, each of the A/V devices having the local IP address expresses its own device information in an eXtensible Markup Language (XML) file, i.e., a deviceInfo.xml file, according to a pre-defined syntax form (defined by a deviceInfo.xsd file) and transmits the XML file to the other A/V devices. The device-Info.xml file includes a uniform resource identifier (URI) of an XHT931.xsd file describing a set of HyperText Transfer Protocol (HTTP) commands for operating the A/V devices.

The A/V device generating the deviceInfo.xml file generates the XHT931.xml file including the HTTP commands, which the A/V device supports, with reference to the XHT931.xsd file.

The deviceInfo.xml file expressing the information of the A/V device and the XHT931.xml file including the HTTP commands supported by the A/V device are received by any one of the other A/V devices, which can recognize the information of the A/V device transmitting the files based on the received files and can control the A/V device using the HTTP commands.

FIG. 1 shows an example of the content of a deviceInfo.xml file 10 generated by an A/V device according to the syntax of a deviceInfo.xsd file. The position information, date, and version of the deviceInfo.xsd are written at a deviceInfo tag position 12. The name of a manufacturing company, URI, and manufacturing date of the A/V device are written at a manufacturer tag position 13. The functional name, subname, and model name of the A/V device are written at a functionType tag position 14. A coding method and a bitrate for streaming are written at a 1394StreamSource tag position 15.

Information regarding user interface is written at a userinterface tag position 16 and information regarding user interface notifying the occurrence of an event is written at an eventNotificationUI tag position 17. Referring to FIG. 1, a user interface function is not supported. The name of an XHT standard supporting HTTP commands and a file (i.e., an XHT931.xsd file) defining the HTTP commands are written at an HTTPCommandInterfaceRef tag position 18.

FIG. 2 shows an example of the content of an XHT931.xml file 20 generated by an A/V device according to the syntax of an XHT931.xsd file.

The URI, date, and version of the XHT931.xsd file that is referred to are written at an OperationList tag position 22. Therebelow, operations codes supported by the A/V device are written. Referring to FIG. 2, the A/V device supports a function 23, i.e., EVENT-NOTIFICATION that notifies other A/V devices of the change of a state of the A/V device, a function 24, i.e., POWER that turns on or off the power of the A/V device, a function 25, i.e., PLAY that initiates playback of content, a function 26, i.e., STOP that stops the playback of content, a function 27, i.e., PAUSE that temporarily holds the playback of content, and a function 28, i.e., REWIND that rewinds content.

When a first A/V device receiving the deviceInfo.xml file and the XHT931.xml file controls a second A/V device transmitting the two xml files, the first A/V device can control the second A/V device using an HTTP command combining a URI and an operation code.

For example, when the first A/V device is a digital TV and the second A/V device is a source device storing a transport stream (TS), it is assumed that a user inputs a command for viewing a program included in the TS into the digital TV using a remote control unit. If an IP address allocated to the source device is 192.168.0.2, the digital TV just transmits an HTTP command "http://192.168.0.2/CEA931?play&press" to the source device. Since an A/V device complying with the XHT standard has a web server and includes a device controller converting the HTTP command into an operation therewithin, the source device can execute an operation corresponding to the transmitted HTTP command. Accordingly, the source device transmits the TS to the digital TV using an IEEE1394 network and the digital TV receives and decodes the TS and displays the decoded TS to the user.

As described above, the XHT facilitates communication and control between a plurality of A/V devices so that a user just controls only one A/V device to effectively control the other A/V devices. However, taking account of the popularity of a large capacity hard disc and users' diverse tastes for multimedia contents like video, still images, and audio, the conventional XHT standard is not very satisfactory for using and managing diverse contents on an A/V network.

Therefore, a technique of efficiently arranging and displaying contents on an A/V network to a user and enabling the user to conveniently enjoy a desired content is desired.

SUMMARY OF THE INVENTION

The present invention provides a method and system for efficiently managing information on contents existing on an audio/video (A/V) network.

The present invention also provides an improved eXpandable Home Theater (XHT) using a technique of enabling A/V devices sharing content information with each other.

According to an aspect of the present invention, there is provided a control device which receives a list of contents from a collection device collecting content information of each content possessed by a source device within an audio/video (A/V) network and controls execution of the content using the list of the contents, the control device including a contents list requestor requesting the list of the contents existing on the A/V network from the collection device in response to a user's command, a web browser displaying a list page, which is provided by the collection device in response to the request of the list, and receiving from the user a command to execute a content selected from the contents displayed on the list page, a content decoder restoring the content from a content stream provided by the source device possessing the selected content, and a content display displaying the restored content to the user.

According to another aspect of the present invention, there is provided a collection device which collects contents existing on an audio/video (A/V) network and manages the content, the collection device including a content information requester requesting content information of content possessed by at least one source device from the source device when a predetermined condition is satisfied, a markup language (ML) document parser parsing an ML document comprising the content information, which is received from the source device as a response to the request of the content information requester, a list page generator generating a list page based on a result of the parsing, and a web server providing the list page to a control device.

BRIEF DESCRIPTION OF THE DRAWINGS

The above and other features and advantages of the present invention will become more apparent by describing in detail exemplary embodiments thereof with reference to the attached drawings in which:

FIG. 1 shows an example of the content of a deviceInfo.xml file generated by an audio/video (A/V) device according to the syntax of a deviceInfo.xsd file;

FIG. 2 shows an example of the content of an XHT931.xml file generated by an A/V device according to the syntax of an XHT931.xsd file;

FIG. 5 is a block diagram of a source device according to an embodiment of the present invention;

FIG. 6 shows an example of the content of a ContentInfo.xsd file according to an embodiment of the present invention;

FIG. 7 shows an example of a ContentInfo.xml file generated by an A/V device according to the ContentInfo.xsd file shown in FIG. 6;

FIG. 8 shows an example of a list page generated by the collection device shown in FIG. 4;

FIG. 11 is a flowchart of a method according to another embodiment of the present invention.

DETAILED DESCRIPTION OF THE INVENTION

Figure 3:
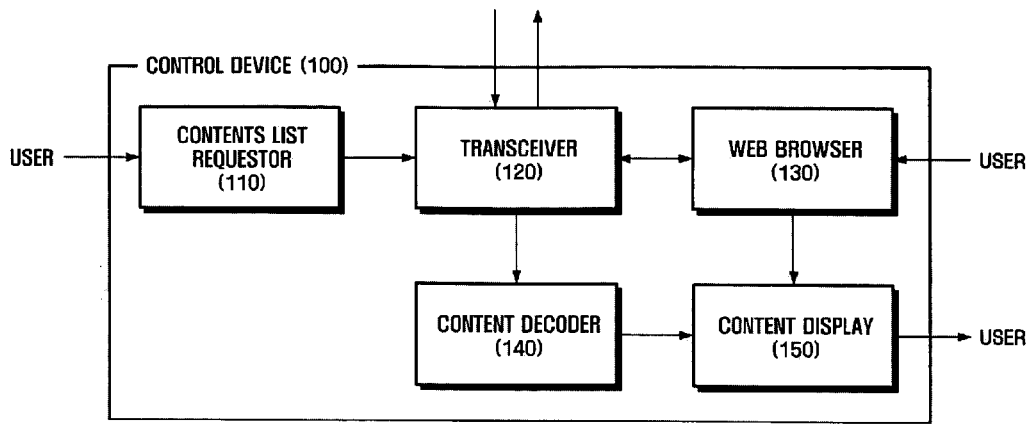
FIG. 3 is a block diagram of a control device according to an embodiment of the present invention.

The present invention will now be described more fully with reference to the accompanying drawings, in which exemplary embodiments of the invention are shown.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

An audio/video network (particularly, an eXpandable Home Theater (XHT) network to which the present invention is not restricted) according to an embodiment of the present invention includes a control device 100, a collection device 200, and a source device 300. The control device 100 includes at least a content decoder decoding content (multimedia data such as video, images, and audio) and a content display reproducing and outputting the decoded content to a user. The control device 100 can control other A/V devices existing on the A/V network in response to the user's command and may be a digital television (TV), a plasma display panel (PDP), a liquid crystal display (LCD) monitor, an audio receiver, or the like.

The collection device 200 receives content information from one or more source devices 300 in response to a request from the control device 100, obtains a user interface (UI) including a contents list from the received content information, and provides the UI to the control device 100. The collection device 200 may be a single independent device having only the above-described function on the A/V network or may be one of the source devices 300, which includes the above-described function. Alternatively, the collection device 200 may be implemented as a module within the control device 100.

The source device 300 stores contents on the A/V network. The contents may be files of broadcasting programs recorded in an A/V device or media stored in a compact disc (CD), a digital versatile disc (DVD), or a digital-VHS (D-VHS). Accordingly, the source device 300 may be a device such as a set-top box, a digital TV, a DVD player, or a D-VHS player that is directly equipped with and possesses a content source but may be a device that receives contents from other devices and stores them.

FIG. 3 is a block diagram of the control device 100 according to an embodiment of the present invention. The control device 100 may include a contents list requester 110, a transceiver 120, a web browser 130, a content decoder 140, and a content display 150.

The contents list requestor 110 requests a list of contents existing on the A/V network from the collection device 200 in response to a user's command. The user's command may be input to the control device 100 through a remote control unit (not shown) or through a panel installed on the control device 100. The user's command requesting the contents list may be transmitted to the collection device 200, for example, in the form of a predefined HyperText Transfer Protocol (HTTP) command having an Internet Protocol (IP) address of the collection device 200 as a destination.

The web browser 130 displays a list page that is provided from the collection device 200 in response to the list request to the user through the content display 150. And the web browser 130 receives a command from the user on the list page. For example, the web browser 130 receives from the user a command to execute at least one content selected from among contents displayed on the list page.

The content decoder 140 restores the selected content from a content stream provided from the source device 300 possessing the selected content and provides the restored content to the content display 150. The content stream may be a video stream in a Motion Picture Experts Group (MPEG)-2 transport stream (TS) format or an audio stream in an MPEG Layer 3 (MP3) format. Besides, streams may be made in various video formats and audio formats. However, when content is an image, a file in an image format such as a Joint Photographic Experts Group (JPEG) is completely downloaded (not in a stream), and then, content is restored.

The content display 150 displays the content restored by the content decoder 140 to the user. When the content is a video or an image, it is displayed through a display device such as a cathode-ray tube (CRT), an LCD, or a PDP. When the content is audio, it is displayed through an amplifier and a speaker.

The transceiver 120 transmits and receives data to and from the collection device 200 and the source device 300 through a wired/wireless network. The transceiver 120 may be implemented as any one of diverse network interfaces according to the Institute of Electrical and Electronics Engineers (IEEE) 1394 used in an XHT standard, the IEEE 802.11 family of a wireless local area network (WLAN) standard, Ethernet of a wired LAN standard, etc.

Figure 4:
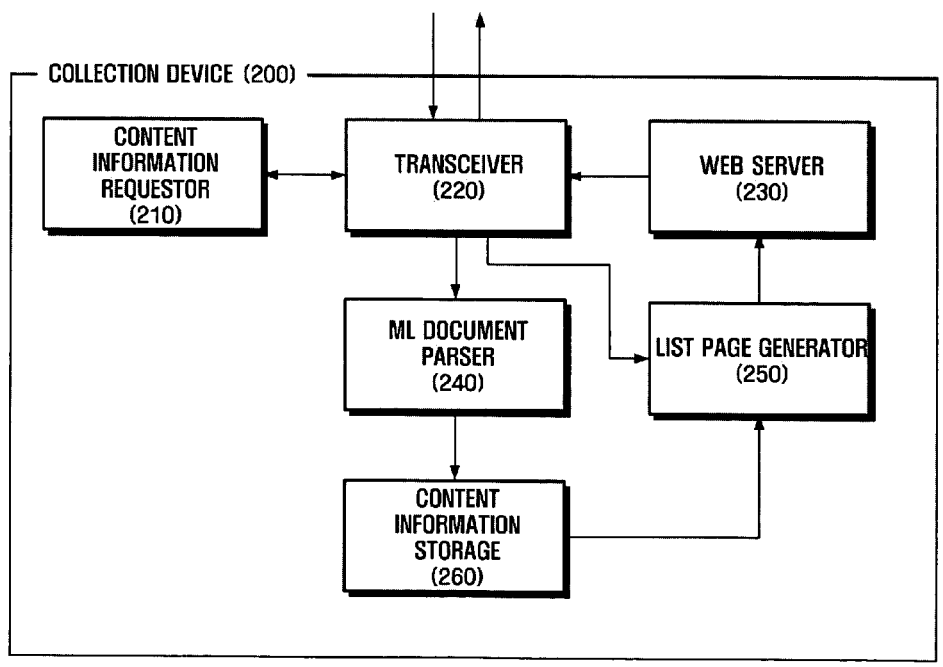
FIG. 4 is a block diagram of a collection device according to an embodiment of the present invention.

FIG. 4 is a block diagram of the collection device 200 according to an embodiment of the present invention. The collection device 200 may include a content information requestor 210, a transceiver 220, a web server 230, a markup language (ML) document parser 240, a list page generator 250, and a content information storage 260.

The content information requestor 210 requests content information possessed by the source device 300 from the source device 300 when a predetermined condition is satisfied. For example, the content information requestor 210 may request content information when it has received a contents list request from the control device 100 or may periodically request content information at a predetermined interval.

The content information requestor 210 may request content information from all source devices 300 existing on the A/V network, but the present invention is not restricted thereto. The content information requestor 210 may request content information from only some of the source devices 300 on the A/V network. The content information may include meta data such as a content title, a content type (e.g., a video, an image, or an audio), a player (e.g., a director or a singer), a generation date, an encoding format, a bitrate, etc., a position (e.g., a uniform resource identifier (URI)) where the content is stored, and a control operation (e.g., play, stop, or pause) supported by the content. The content information may be operated by an HTTP command. For example, when the IP address of the source device 300 is "192.168.0.2," a content information request command may be expressed as "http://192.168.0.2/ContentInfo.cgi."

The ML document parser 240 receives a ML document including the content information from the source device 300 and parses it. The ML document may be an eXtensible ML (XML) document, a HyperText ML (HTML) document, a Standard Generalized ML (SGML) document, or a file that structurally defines data according to other formats.

The content information storage 260 stores the content information that has been provided from each of a plurality of source devices 300 and parsed by the ML document parser 240. The content information is stored for each source device 300. When it is determined that the content information of a certain source device 300 has been changed according to the result of parsing the ML document, previously stored content information is updated with the changed content information.

The list page generator 250 generates a list page showing the list of contents existing on the A/V network using the content information stored for each source device 300 in response to the contents list request from the control device 100. An example of the list page is described in detail with reference to FIG. 8 later.

The web server 230 provides the list page to the control device 100 in a hyper-text format.

The transceiver 220 transmits and receives data to and from the control device 100 and the source device 300 through a wired/wireless network. The transceiver 220 may be implemented as any one of diverse network interfaces according to the IEEE 1394 used in an XHT standard, the IEEE 802.11 family of a WLAN standard, Ethernet of a wired LAN standard, etc.

FIG. 5 is a block diagram of the source device 300 according to an embodiment of the present invention. The source device 300 includes a content storage 310, a transceiver 320, a web server 330, a stream generator 350, a common gateway interface (CGI) 360, and a content page generator 370.

The content storage 310 stores diverse formats of contents. The diverse formats may include a stream format such as an MPEG-2 TS and formats such as an audio video interleave (AVI) format, a JPEG format, and an MP3 format that can be read on a computer.

The CGI 360 controls the ML document generator 340, the stream generator 350, and content page generator 370 according to CGI commands (e.g., a play command, a pause command, a stop command, and a content information request command) received from the control device 100 or the collection device 200.

The ML document generator 340 extracts content information of a content stored in the content storage 310 and generates or changes an ML document expressing the content information in a particular format when a predetermined condition is satisfied. The predetermined condition may be the control of the CGI 360 (i.e., the request of the collection device 200), a predetermined interval, or the generation of a new content or the change of the content. The generated ML document may be stored in a predetermined memory (not shown).

The stored content may include content information such as a type, a player, a generation date, an encoding format, a bitrate in a form of a tag. Otherwise, the content information may be extracted by reproducing a sample of the content.

The particular format is predefined so that A/V devices existing on the A/V network can recognize the format in common. When an ML document in an XML format is used, the particular format may comply with XML Schema Definition (XSD).

In an embodiment of the present invention, an ML document expressing content information has a file name "ContentInfo.xml" and an XSD document defining the particular format of the ML document has a file name "ContentInfo.xsd."

FIG. 6 shows an example of the content of a ContentInfo.xsd file according to an embodiment of the present invention. In an xsd:schema tag 30, a parameter xmlns 31 indicates a position of a the ContentInfo.xsd file and a parameter xmlns:xs 32 indicates a position of a file that defines an XML standard format.

In an Xs:element tag 40, a parameter "name" is set to ContentInfo and a parameter "type" is set to ContentInfoType. In an Xs:element tag 41, a number, i.e., maxOccurs indicated by a parameter "content" is set as unbounded. Here, since the parameter "content" may be as many as the number of contents possessed by the source device 300 in number, the maximum of the parameter "content" is indefinite. To restrict the number of contents whose information is transmitted from a single source device 300 to the collection device 200, the parameter "maxOccurs" may be set to a particular numeral.

In an Xs:element tag 50, a parameter "name" is set to Content and a parameter "type" is set to ContentType. A tag whose name is set to "Content" has elements, i.e., "title," "album", "singer", "preview", "group", "date", and "control" in a sub-element 51. Here, "maxOccurs" indicates a maximum number of displays and "minOccurs" indicates a minimum number of displays. For example, when "maxOccurs" is 1 and "minOccurs" is 1, display occurs once unconditionally. When "maxOccurs" is 1 and "minOccurs" is 0, display may occur once or may not occur at all.

In a sub-element 53 of a control tag 52, one of three types, i.e., "play," "stop," and "pause" exists. Since "maxOccurs" is 3 and "minOccurs" is 1 in the control tag 52, a maximum of three types and a minimum of one type among "play", "stop", and "pause" may be displayed.

An xs:attribute tag 54 indicates the attribute of the xs:element tag 50 having the "content" as the name. The name of the xs:attribute tag 54 set to a "type," which is divided into three categories 55, i.e., "image," "audio," and "video."

FIG. 7 shows an example of a ContentInfo.xml file generated by the source device 300 according to the ContentInfo.xsd file shown in FIG. 6.

In a contentInfo tag 60, a parameter "xmlns" has the same value as the parameter xmlns 30 shown in FIG. 6, that is, the parameter "xmlns" indicates a position, i.e., URI where the ContentInfo.xsd file can be obtained. The source device 300 transmitting the ContentInfo.xml possesses three types of contents, i.e., an audio content, an image content, and a video content. A content tag 70 whose type is set to "audio" has a sub-element 71 including four types, i.e., "title," "album", "singer", and "control" among the elements included in the sub-element 51 shown in FIG. 6. Here, since the "title" must be displayed once with respect to each content unconditionally as described with reference to FIG. 6, the "title" cannot be omitted. With respect to the "control," one through three types can be displayed. Since the "minOccurs" is 0, the remaining elements may not be displayed. Here, the element "control" has all of "play," "stop", and "pause" defined as the three types of the control element in FIG. 6. The content of the element "control" is position information (i.e., a URI) of the audio content.

Similarly, a content tag 80 whose type is set to the "image" has a sub-element 81 including a plurality of elements. Here, since the content is the image, only a control element whose type is "play" exists. The content tag 80 further includes elements, i.e., "group," "date," and "preview" in addition to the mandatory elements, "title" and "control." Here, information on a position where a thumbnail image of an original image is stored is displayed as the content of the element "preview."

A content tag 90 whose type is "video" has a sub-element 91 including four elements "title", "group", "date" and "control". The element "control" has three types, "play," "stop," and "pause."

Referring back to FIG. 5, the stream generator 350 is controlled by the CGI 360 to provide the content stored in the content storage 310 to the control device 100 in a stream format that can be transmitted in real time. Files such as AVI files, JPEG files, and MP3 files in a computer data format may be converted into a stream using a protocol for real-time transmission, e.g., a Real-time Transport Protocol (RTP). If a format of the content stored in the content storage 310 is a stream format such as an MPEG-2 TS format, the content can be transmitted at it is.

The content page generator 370 extracts content information from the content stored in the content storage 310 and generates or changes a content page for the content in response to the control of the CGI 360, at a predetermined interval, or when a new content is generated or the content is changed. The generated content page may be stored in a predetermined memory (not shown). When the new content is eliminated, the corresponding content page may be eliminated.

Unlike the list page generated by the collection device 200, the content page is a web page displaying in detail content information of a content selected from among one or more contents possessed by the source device 300 and displays content information by contents.

Figure 9:
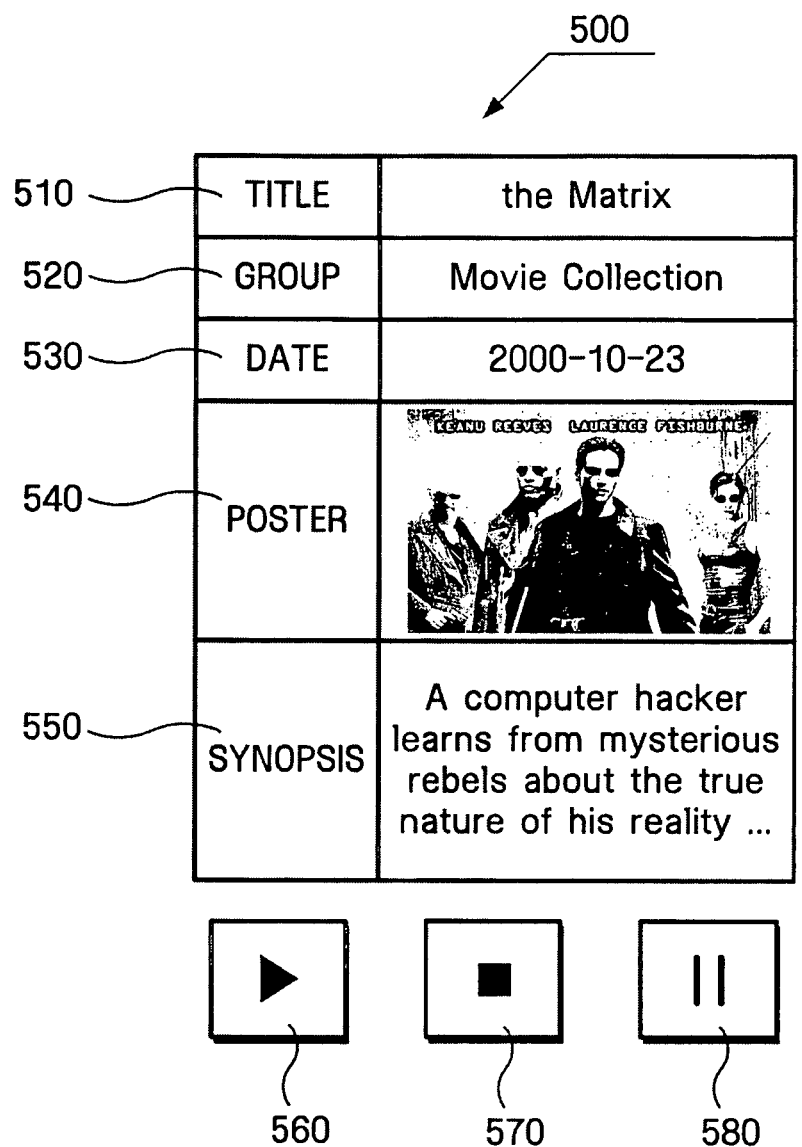
FIG. 9 shows an example of a screen displayed to a user when a hyperlink "the Matrix" is selected on the list page shown in FIG. 8.

FIG. 8 shows an example of a list page 400 generated by the collection device 200. FIG. 9 shows an example of a content page 500 generated by the source device 300.

When the collection device 200 receives an ML document (i.e., a ContentInfo.xml file) including the content information illustrated in FIG. 7 from a source device A, three contents having titles "Number One", "Tiger Woods", and "the Matrix", respectively, are displayed on the list page 400 in a web page format, as shown in FIG. 8. There are two items "TITLE" and "CONTENT TYPE" displaying each content, but other items such as "album", "singer," and "group" that are transmitted over the ML document shown in FIG. 7 may be further displayed. In addition, when an ML document is received from a source device B, contents of the source device B are displayed on the list page 400 in the same manner as the contents of the source device A. Here, all of the received contents may be displayed, but only contents matching with a user's key word may be displayed. For example, the user can control the collection device 200 to display only contents that have a particular title or only particular audio contents.

The title of each content is displayed in a hyperlink format. For example, a hyperlink 430 of the content whose title is "the Matrix" may be expressed as <a href="http://192.168.0.2/play.cgi?matrix.wmv">. An operation command of the "play.cgi" having the "matrix.wmv" as a parameter is transmitted to the CGI 360 of the source device 300. In response to the operation command, the CGI 360 controls the stream generator 350 to provide a streaming service to the control device 100 and controls the content page generator 370 to generate a content page for the selected content so that the content is displayed to the user of the control device 100 through the web server 330.

FIG. 9 shows a screen displayed to the user when the hyperlink 430 of "the Matrix" is selected in the list page 400 shown in FIG. 8. While the screen, i.e., the content page 500 is displayed, a video entitled "the Matrix" is streamed to and reproduced by the control device 100. The content page 500 includes content information including a title 510, a group 520, and a date 530 that are defined by a ContentInfo.xsd file and transmitted to the collection device 200 and other detailed information, e.g., a poster 540 and a synopsis 550.

When a pause button 580 is clicked on while the video is played, streaming is temporarily stopped. When the pause button 580 is clicked on again or a play button 560 is clicked on, the streaming is resumed. When a stop button 570 is clicked on during play or pause, the streaming is completely stopped and the list page 400 shown in FIG. 8 is displayed to the user.

Like the list page 400, the content page 500 may be displayed in the form of a web page. The buttons 560, 570, and 580 may be simply implemented using a java script. The hyperlink of the play button 560 may be expressed as <a href="http://192.168.0.2/play.cgi?matrix.wmv">. Similarly, the hyperlink of the stop button 570 may be expressed as <a href="http://192.168.0.2/stop.cgi?matrix.wmv"> and the hyperlink of the pause button 580 may be expressed as <a href="http://192.168.0.2/pause.cgi?matrix.wmv">.

When the user clicks on the pause button 580, an operation command of the "pause.cgi" is transmitted to the CGI 360 of the source device 300. In response to the operation command, the CGI 360 controls the stream generator 350 to temporarily stop streaming. When the operation command of the "pause.cgi" is received again, the CGI 360 resumes the streaming.

When the user clicks on the stop button 570, an operation command of the "stop.cgi" is transmitted to the CGI 360 of the source device 300. In response to the operation command, the CGI 360 controls the stream generator 350 to completely stop streaming and shows the list page 400 generated by the collection device 200 to the user.

Meanwhile, the XHT standard defines commands (e.g., commands complying with the Consumer Electronics Association (CEA)-931) to play, stop, and give a pause to a current selected content. The play, stop, and pause of a content streamed from the source device 300 can be controlled using these commands. For example, a CEA-931 command for play may be expressed as "http://192.168.0.2/CEA931?play&pressed." A CEA-931 command for stop may be expressed as "http://192.168.0.2/CEA931?stop&pressed." A CEA-931 command for pause may be expressed as "http://192.168.0.2/CEA931?pause&pressed."

Referring back to FIG. 5, the web server 330 provides the content page generated by the content page generator 370 to the control device 100 in a hyper-text format.

The transceiver 320 transmits and receives data to and from the control device 100 and the collection device 200 through a wired/wireless network. The transceiver 320 may be implemented as any one of diverse network interfaces according to the Institute of Electrical and Electronics Engineers (IEEE) 1394 used in an XHT standard, the IEEE 802.11 family of a wireless local area network (WLAN) standard, Ethernet of a wired LAN standard, etc.

The term 'module', as used in FIGS. 3 and 4, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

Figure 10:
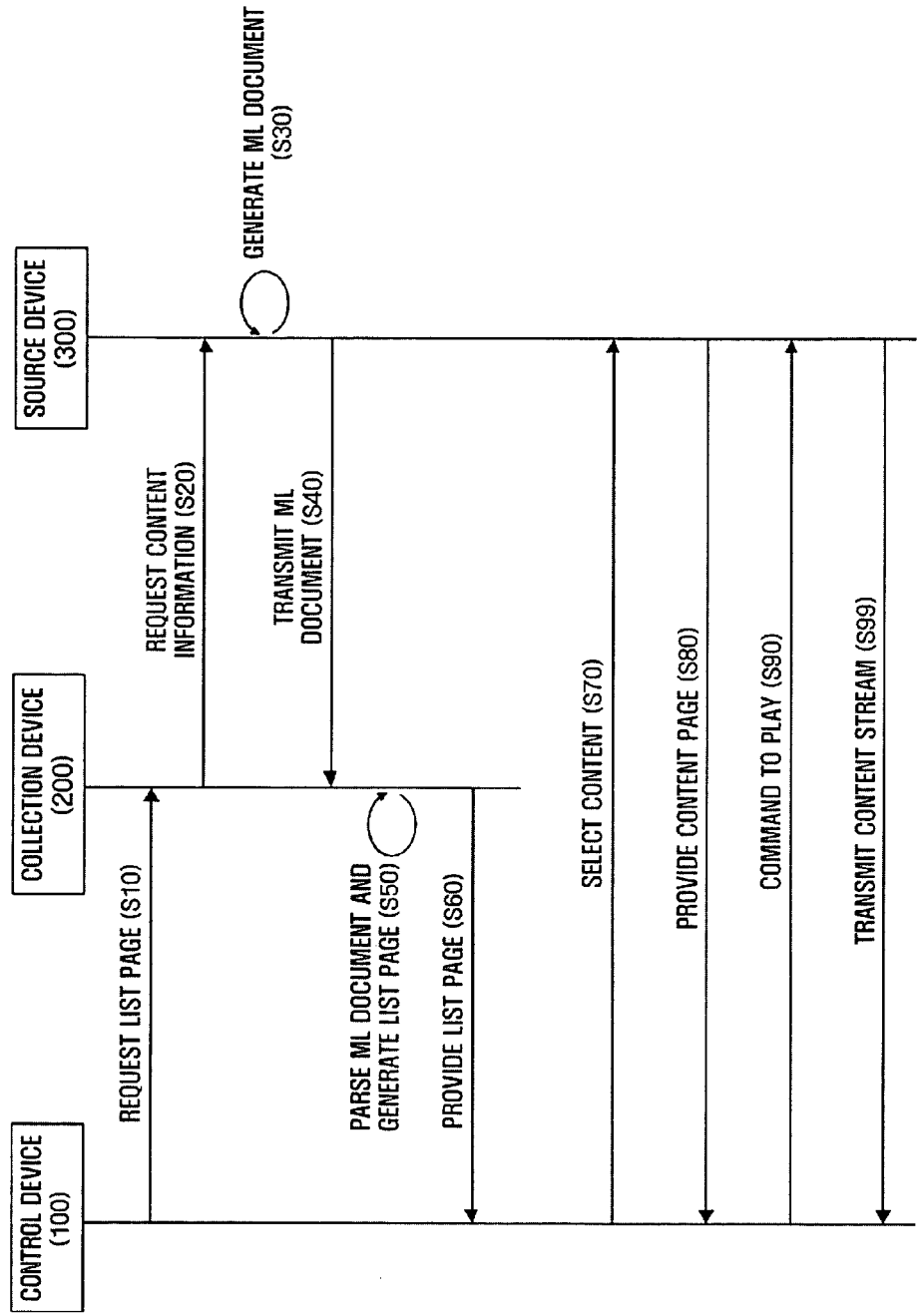
FIG. 10 is a flowchart of a method according to an embodiment of the present invention.

FIG. 10 is a flowchart of a method according to an embodiment of the present invention.

In operation S10, the control device 100 requests a list page showing contents existing on an A/V network from the collection device 200.

In operation S20, the collection device 200 requests content information from the source device 300 existing on the A/V network. For example, when the IP address of the source device 300 is "192.168.0.2," a content information request command may be expressed as "http://192.168.0.2/ContentInfo.cgi."

In operation S30, the source device 300 generates an ML document including the content information that the source device 300 possesses. The ML document may be generated when the content information is requested by the collection device 200. Alternatively, the ML document may be generated in advance of the request, for example, at a predetermined interval or when a new content is generated or a content is changed. The content information includes at least position information (e.g., a URI) of each content and may further include various meta data regarding the content.

In operation S40, the source device 300 provides the ML document to the collection device 200. Here, at least one source device 300 providing the ML document exists.

In operation S50, the collection device 200 parses the ML document to read the content information of each content and generates a list page showing all contents existing on the A/V network based on the parsed ML document. In operation S60, the collection device 200 provides the list page to the control device 100.

Thereafter, when a user selects a content from the list page on the control device 100 in operation S70, a content page corresponding to the selected content is displayed to the user in operation S80.

The user of the control device 100 can control (e.g., play, stop, or give pause to) the content on the content page. If the user of the control device 100 selects a play command on the content page in operation S90, the source device 300 transmits a content stream corresponding to the selected content to the control device 100 in operation S99. With such mechanism, the user can search for a desired content and control the operation on the content even if the user does not know which device on the A/V network possesses the desired content.

FIG. 11 is a flowchart of a method according to another embodiment of the present invention.

Operations S110 through S160 shown in FIG. 11 are the same as operations S10 through S60 shown in FIG. 10. In the embodiment illustrated in FIG. 11, when the user of the control device 100 selects a content from the list page provided by the collection device 200 in operation S170, the source device 300 immediately transmits the content stream to the control device 100 in operation S180. Here, control buttons such as a play button, a stop button, and a pause button for the content are present on the list page. Accordingly, the user can stop or give pause to the content stream immediately played upon the selection of the content.

According to the method and system, information regarding contents possessed by A/V devices and particularly A/V devices complying with an eXpandable Home Theater (XHT) standard on an A/V network can be efficiently shared and integrally managed.

In addition, a list of contents possessed by various source devices can be integrally managed and a user can conveniently control a desired content using a user interface (UI).

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A collection device of an audio/video (AN) network comprising:
   a content information requestor that requests a plurality of metadata of a plurality of contents respectively stored by a plurality of source devices on the AN network from the plurality of source devices, the plurality of contents comprising at least one of multimedia data stored by the plurality of source devices;
   a markup language (ML) document parser that receives a plurality of ML documents from the plurality of source devices respectively, in response to the request of the content information requestor, and parses the plurality of ML documents expressing the plurality of metadata in a plurality of formats of the plurality of ML documents;
   a list page generator that generates a list page of the plurality of contents respectively stored by the plurality of source devices, based on the parsed plurality of ML documents; and
   a web server that transmits the list page to a control device on the A/V network that renders the content stored by the first source device or the second source device in response to a user's selection of one of the contents from the list page, in order that the control device directly receives a stream of the content selected by the user from one of the source devices,
   wherein the plurality of metadata comprise position information that indicates a location at which the plurality of contents are stored by the plurality of source devices, a title of the plurality of contents, and a type of the plurality of contents.

2. The collection device of claim 1, wherein the content information requestor requests the plurality of metadata in response to receiving a contents list request from the control device.

3. The collection device of claim 1, wherein the plurality of metadata comprises a control operation of the plurality of source devices supported by the plurality of contents.

4. The collection device of claim 1, wherein the list page comprises a title of the plurality of contents that are provided in hyperlink formats.

5. The collection device of claim 1, wherein the plurality of ML document are documents in an eXtensible Markup Language (XML) format.

6. The collection device of claim 5, wherein the plurality of ML document expresses metadata of at least the plurality of contents stored by the one of the plurality of source devices.

7. A source device of an audio/video (AN) network which provides metadata of content stored by the source device comprising:
   a content storage that stores the content and the metadata of the content, the content comprising at least one of video, a still image, and audio stored by the source device;
   a markup language (ML) document generator that extracts the stored metadata of the content, generates an ML document that expresses the metadata in a format of the ML document, and transmits the ML document to a collection device on the AN network;
   a content page generator that extracts the metadata of the stored content and generates a content page that expresses the metadata of the content as a web page based on the stored metadata, the content page comprising (i) the metadata formatted according to the ML document and an eXtensible Markup Language Schema Documentation (XSD) file that defines formatting of the ML document, and (ii) user interface graphics that control the source device to play, pause, and stop rendering of the content;
   a web server that directly transmits the content page in a hyper-text format to a control device on the AN network that renders the content stored by the content storage in response to a user's selection of the content from a list page of content stored on a second device of the AN network and the content of the source device and selection of the user interface commands from the content page to render the content; and
   a stream generator that directly transmits the stored content to the control device in a stream format.

8. The source device of claim 7, wherein the ML document generator generates the ML document in response to change of the stored content.

9. The source device of claim 7, wherein the ML document generator generates the ML document in response to receiving a content information request from the collection device.

10. The source device of claim 7, wherein the metadata comprises a location at which the content is stored by the source device.

11. The source device of claim 7, wherein the content page comprises meta data of the content and an interface that controls rendering of the content.

12. The source device of claim 7, wherein the ML document is a document in an eXtensible Markup Language (XML) document.

13. The source device of claim 7, wherein the stream format is a video stream having a Motion Picture Experts Group (MPEG)-2 transport stream (TS) format.

14. A method of collecting the plurality of first contents respectively stored by the plurality of source devices on an audio/video (A/V) network, the method comprising:
   requesting, by a collection device on the A/V network, a plurality of metadata of the plurality of contents from the plurality of source devices, the plurality of content comprising a multimedia data;
   receiving a plurality of markup language (ML) documents that expresses the plurality of metadata respectively stored by the plurality of source devices;
   parsing the plurality of ML documents, and generating a list page that shows the plurality of contents stored by the plurality of source devices, based on the parsed plurality of ML documents; and transmitting the list page to a control device on the A/V network that renders one of the contents respectively stored by the plurality of source devices in response to a user's selection of the content from the list page, in order that the control device directly receives a stream of the content selected by the user from one of the source devices, wherein the plurality of metadata comprise position information that indicates a location at which the plurality of contents are stored by the plurality of source devices, a title of the plurality of contents, and a type of the plurality of contents.

* * * * *